(12) United States Patent
Takano

(10) Patent No.: US 7,156,199 B2
(45) Date of Patent: Jan. 2, 2007

(54) MOTORCYCLE

(75) Inventor: Kazuhisa Takano, Shizuoka-ken (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 59 days.

(21) Appl. No.: 10/780,279

(22) Filed: Feb. 17, 2004

(65) Prior Publication Data

US 2004/0178012 A1 Sep. 16, 2004

(30) Foreign Application Priority Data

Feb. 18, 2003 (JP) .............................. 2003-040332

(51) Int. Cl.
*B62K 13/06* (2006.01)

(52) U.S. Cl. ..................... 180/309; 180/225

(58) Field of Classification Search ............... 180/227, 180/225, 309

See application file for complete search history.

(56) References Cited

U.S. PATENT DOCUMENTS

| | | | |
|---|---|---|---|
| 3,318,403 A * | 5/1967 | Hansen .................. | 180/185 |
| 4,437,306 A * | 3/1984 | Ikenoya et al. ............ | 60/293 |
| 4,474,144 A * | 10/1984 | Tanaka et al. ............ | 123/54.4 |
| 4,475,622 A * | 10/1984 | Tsunoda et al. ........... | 181/227 |
| 4,531,606 A * | 7/1985 | Watanabe ................ | 180/210 |
| 4,696,366 A * | 9/1987 | Hattori .................. | 180/296 |
| 4,781,264 A * | 11/1988 | Matsuzaki et al. .......... | 180/219 |
| 4,881,614 A * | 11/1989 | Hoshi et al. .............. | 180/225 |
| 4,993,508 A * | 2/1991 | Nozoe et al. .............. | 180/219 |
| 5,016,725 A * | 5/1991 | Muramatsu ............... | 180/225 |
| 5,474,146 A * | 12/1995 | Yoshioka et al. ........... | 180/184 |
| 6,290,016 B1 * | 9/2001 | Umeoka .................. | 180/219 |
| 6,516,909 B1 * | 2/2003 | Gogo .................... | 180/219 |
| 6,675,933 B1 * | 1/2004 | Yamaguchi ............... | 181/227 |
| 6,679,347 B1 * | 1/2004 | Iimuro ................... | 180/219 |
| 6,808,034 B1 * | 10/2004 | Nakano et al. ............ | 180/190 |
| 6,857,497 B1 * | 2/2005 | Sato et al. ............... | 180/312 |
| 6,860,359 B1 * | 3/2005 | Tanabe et al. ............. | 180/309 |
| 6,889,789 B1 * | 5/2005 | Kurayoshi et al. .......... | 180/219 |
| 6,920,949 B1 * | 7/2005 | Matsuura et al. .......... | 180/68.2 |
| 2004/0216452 A1 * | 11/2004 | Nakagome ............... | 60/299 |

FOREIGN PATENT DOCUMENTS

| | | | |
|---|---|---|---|
| JP | 02197484 A | * | 8/1990 |
| JP | 02249778 A | * | 10/1990 |
| JP | 03-011372 | | 3/1991 |
| JP | 04-013232 | | 3/1992 |

* cited by examiner

*Primary Examiner*—Lesley D. Morris
*Assistant Examiner*—Daniel Yeagley
(74) *Attorney, Agent, or Firm*—Hogan & Hartson LLP

(57) ABSTRACT

A motorcycle includes a seat supporting member provided extending in a rearward direction from a body. The seat supporting member includes an upper seat supporting member with a seat in place and a lower seat supporting member connected to and separated in a downward direction from the upper seat supporting member. The lower seat supporting member is configured as a plate-like member in a shape to cover a region above at least an exhaust pipe.

14 Claims, 13 Drawing Sheets

MOTORCYCLE

BACKGROUND OF THE INVENTION

1. Field of the Invention

This invention relates to a motorcycle.

2. Description of Related Art

Generally, in some motorcycles, a main frame extends in a rearward direction from a head pipe and a rear arm for supporting a rear wheel attached at the rear of the main frame for an up and down swinging movement. At the same, an exhaust pipe of an engine extends in a rearward direction around a region below the engine and a muffler connected to the exhaust pipe disposed at a higher position than the rear wheel.

The muffler connected to the exhaust pipe as described above is usually attached directly to a seat rail or directly to a cross member of the seat rail.

As described above, the muffler connected to the exhaust pipe is usually attached directly to the seat rail or the cross member of the seat rail, so that the seat disposed on the seat rail is affected by heat from the exhaust pipe and the muffler. Therefore, other components besides the seat rail are required, for preventing heat transmission from the exhaust pipe and the muffler to the seat, causing a problem of a complex structure, an increased number of parts and increased costs.

In view of the foregoing, an advantage of the present invention is to provide a motorcycle in which a seat is supported with a simple structure, heat transmission is mitigated, the number of parts is reduced and the cost is lowered.

SUMMARY OF THE INVENTION

In order to solve the foregoing problem and to achieve the foregoing advantage, this invention is arranged as indicated below.

The invention is a motorcycle including a body frame, a seat, an engine mounted on the body frame, and an exhaust pipe connected to the engine and disposed below the seat. The motorcycle also includes a seat supporting member provided extending in a rearward direction from a body and the seat supporting member is made up of an upper seat supporting member with the seat in place, and a lower seat supporting member connected to and separated in a downward direction from the upper seat supporting member. The lower seat supporting member is configured as a plate-like member in a shape to cover a region above at least the exhaust pipe. This arrangement allows heat from the exhaust pipe to be blocked by the lower seat supporting member and a space between the lower seat supporting member and the upper seat supporting member, so that heat transmission from the exhaust pipe to the seat is prevented. Therefore, no heat insulating material or the like is required to be used to prevent heat transmission from the exhaust pipe to the seat.

In addition, the lower seat supporting member has a structure in which a frame portion for supporting the seat opens in a downward direction, therefore it shuts off heat transmission from the exhaust pipe as well as supporting the seat, and the exhaust pipe can be cooled down by the outside air.

A rear arm is supported on the body through a pair of left and right rear cushions for an up and down swinging movement. The front of the lower seat supporting member, passing through a space between the pair of left and right rear cushions and the exhaust pipe, is attached to the body.

This arrangement allows the lower seat supporting member to be supported on the body reliably and heat transmission from the exhaust pipe to the rear cushions to be prevented by the lower seat supporting member.

In addition, the lower seat supporting member extends to a position where it is interposed between the rear cushions and the exhaust pipe, to cover the exhaust pipe. This arrangement can prevent heat transmission from the exhaust pipe to the rear cushions reliably.

In addition, the lower seat supporting member has a shape to cover the muffler in addition to the exhaust pipe, therefore heat transmission from the exhaust pipe and the muffler can be shut off.

In addition, the lower seat supporting member covers a portion of the exhaust pipe where a catalyst is disposed inside, therefore heat transmission from the portion of the catalyst at high temperatures can be shut off.

In addition, the upper seat supporting member is configured as a plate-like member, and the seat supporting member is made up of the upper seat supporting member and the lower seat supporting member in a hollow shape. This arrangement allows the hollow section to serve as an insulating space, thereby preventing heat transmission from the exhaust pipe to the seat more reliably.

DETAILED DESCRIPTION OF THE PREFERRED EMBODIMENTS

Now, embodiments of this invention will be described with reference to the accompanying drawings, but this invention is not limited to these embodiments.

Figure 1:
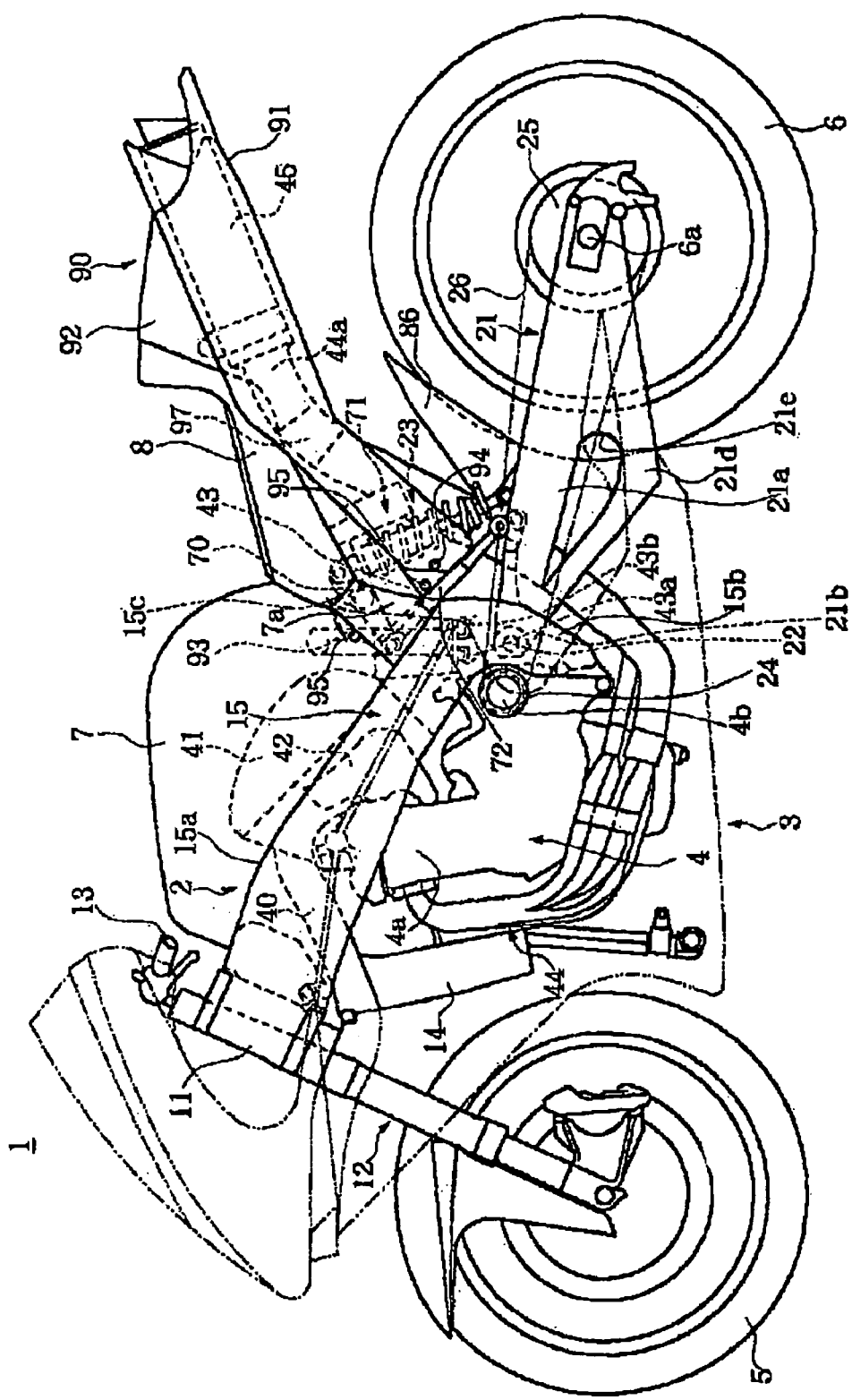
FIG. 1 is a side view of a motorcycle.
Figure 2:
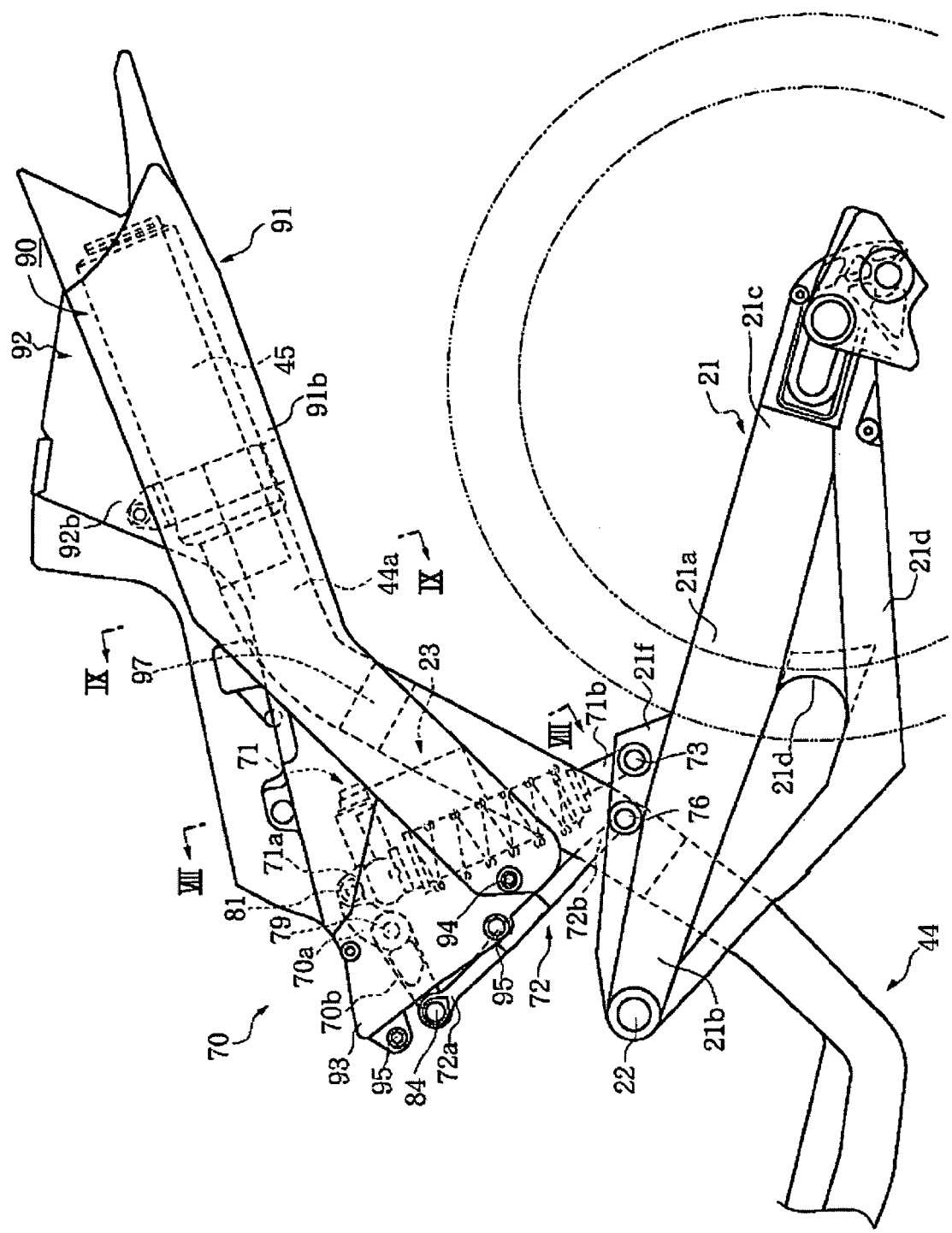
FIG. 2 is a side view showing an arrangement of a rear arm, a rear cushion and an exhaust pipe.
Figure 3:
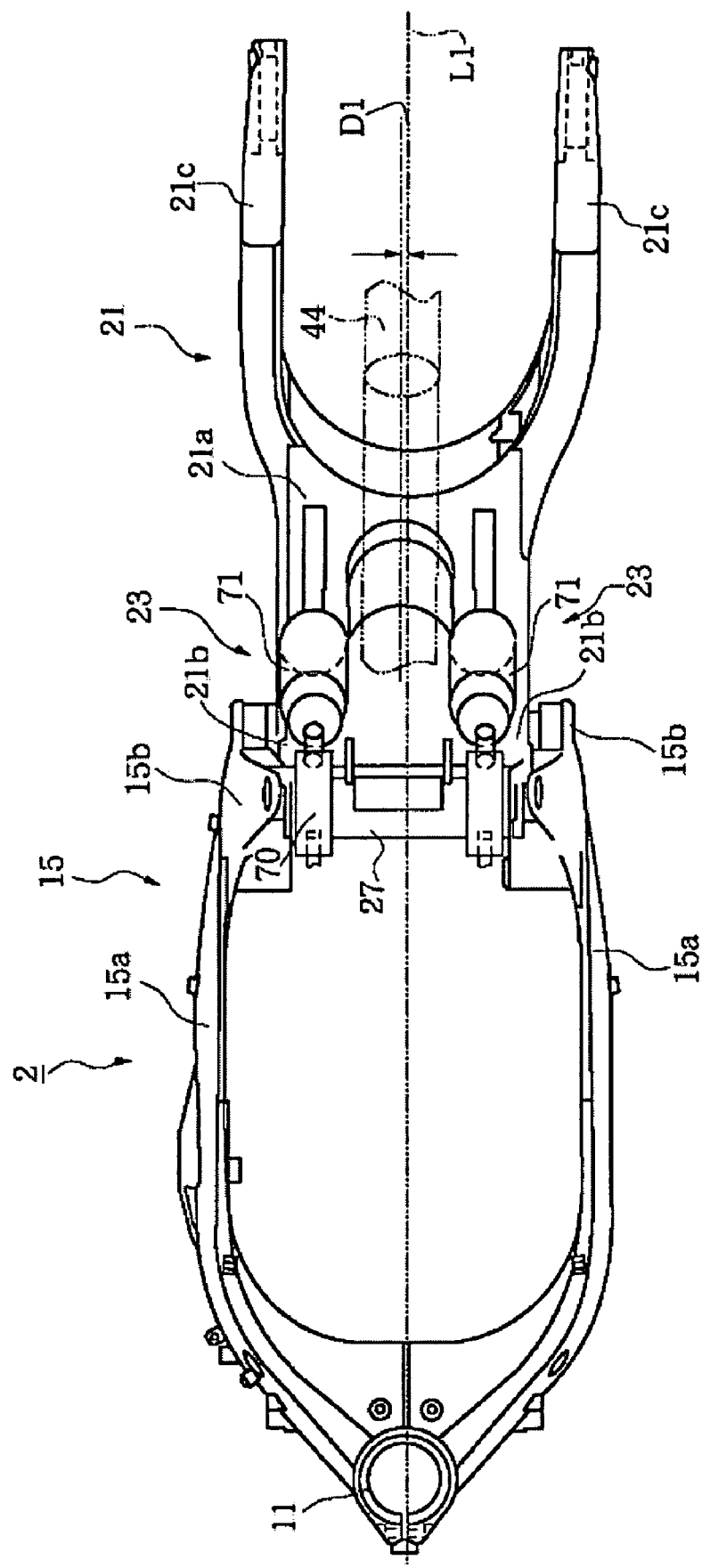
FIG. 3 is a plan view showing an arrangement of a main frame, a rear arm and rear cushions.
Figure 4:
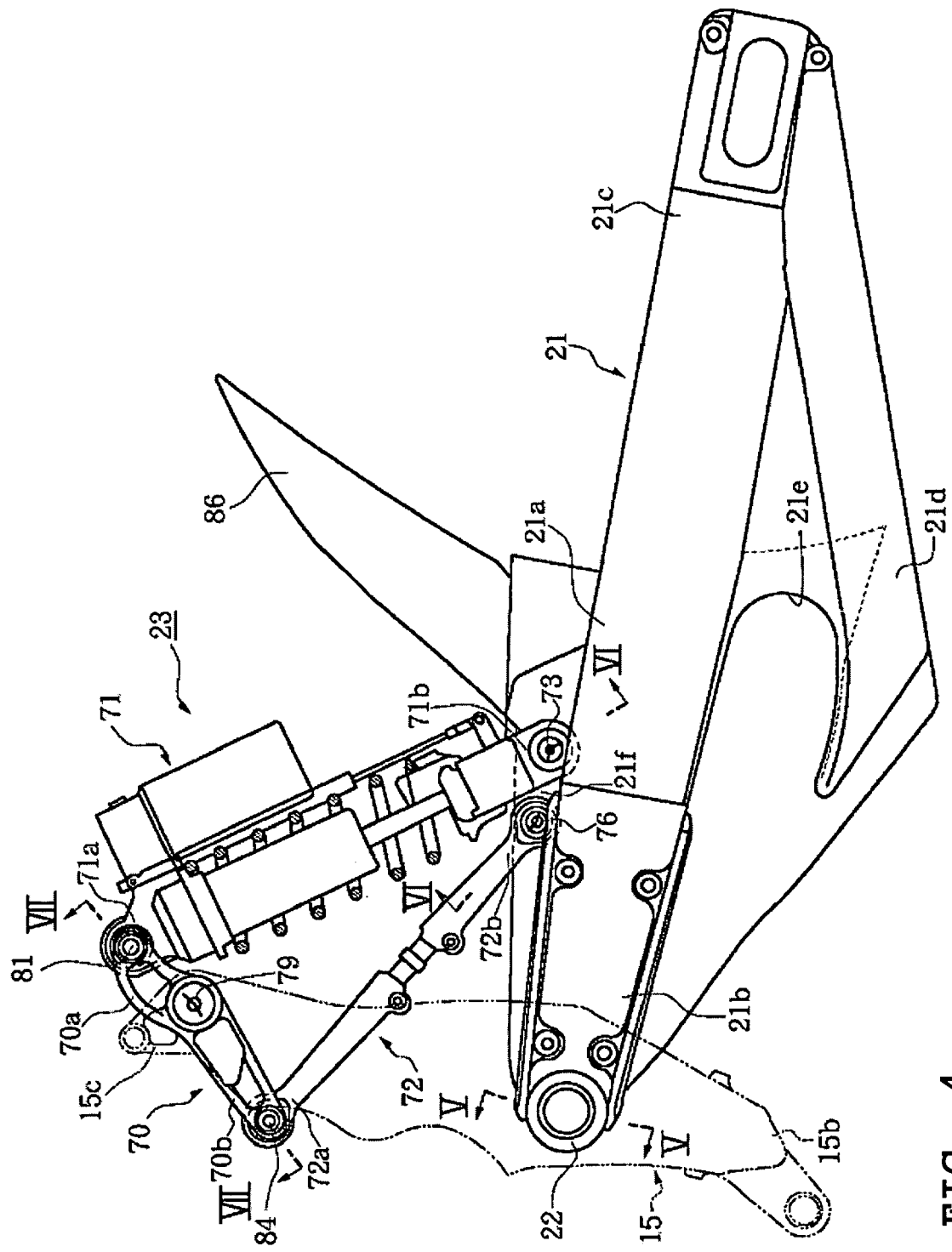
FIG. 4 is a side view showing an arrangement of the rear arm and the rear cushion.
Figure 5:
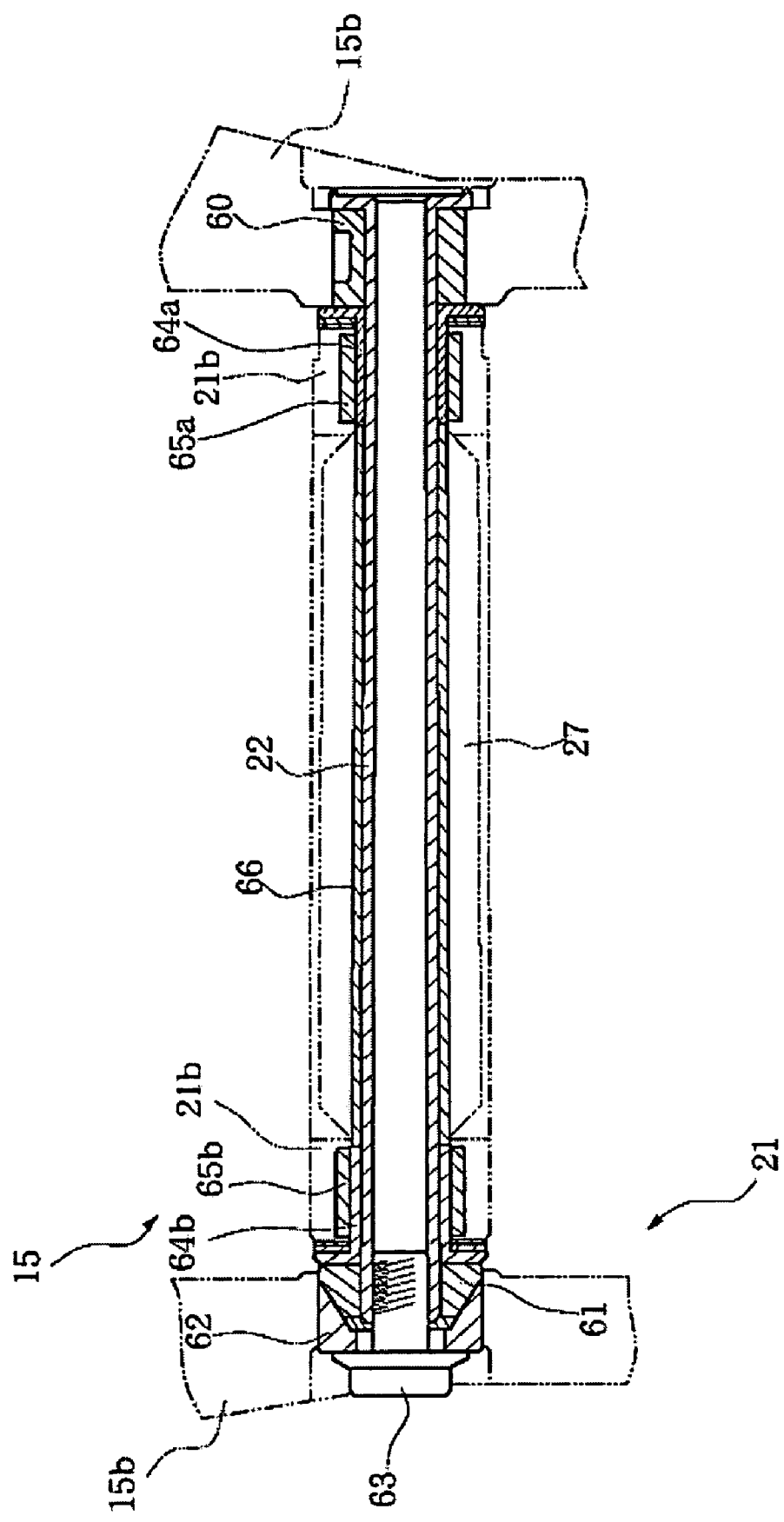
FIG. 5 is a sectional view taken along a line V—V of FIG. 4.
Figure 6:
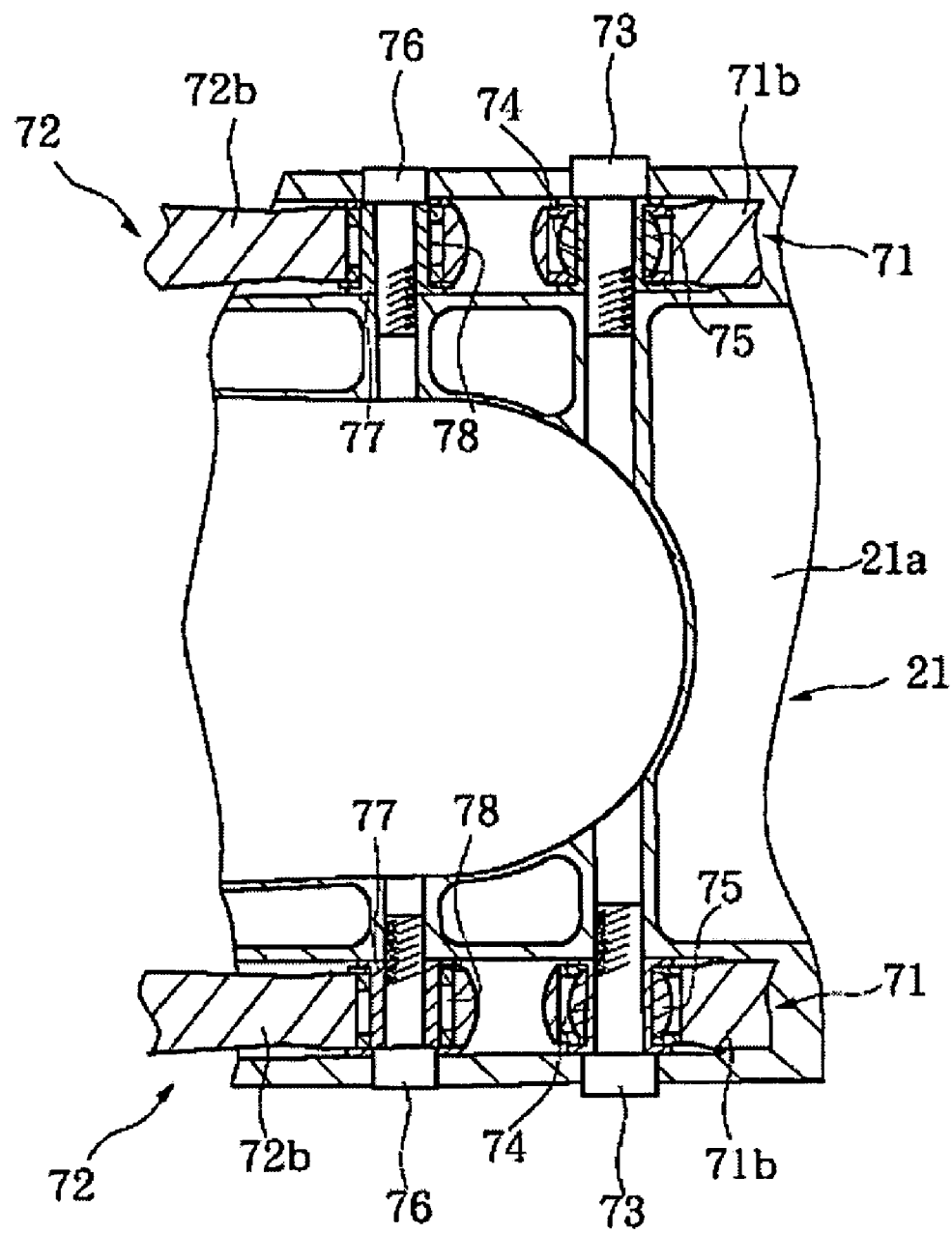
FIG. 6 is a sectional view taken along a line VI—VI of FIG. 4.
Figure 7:
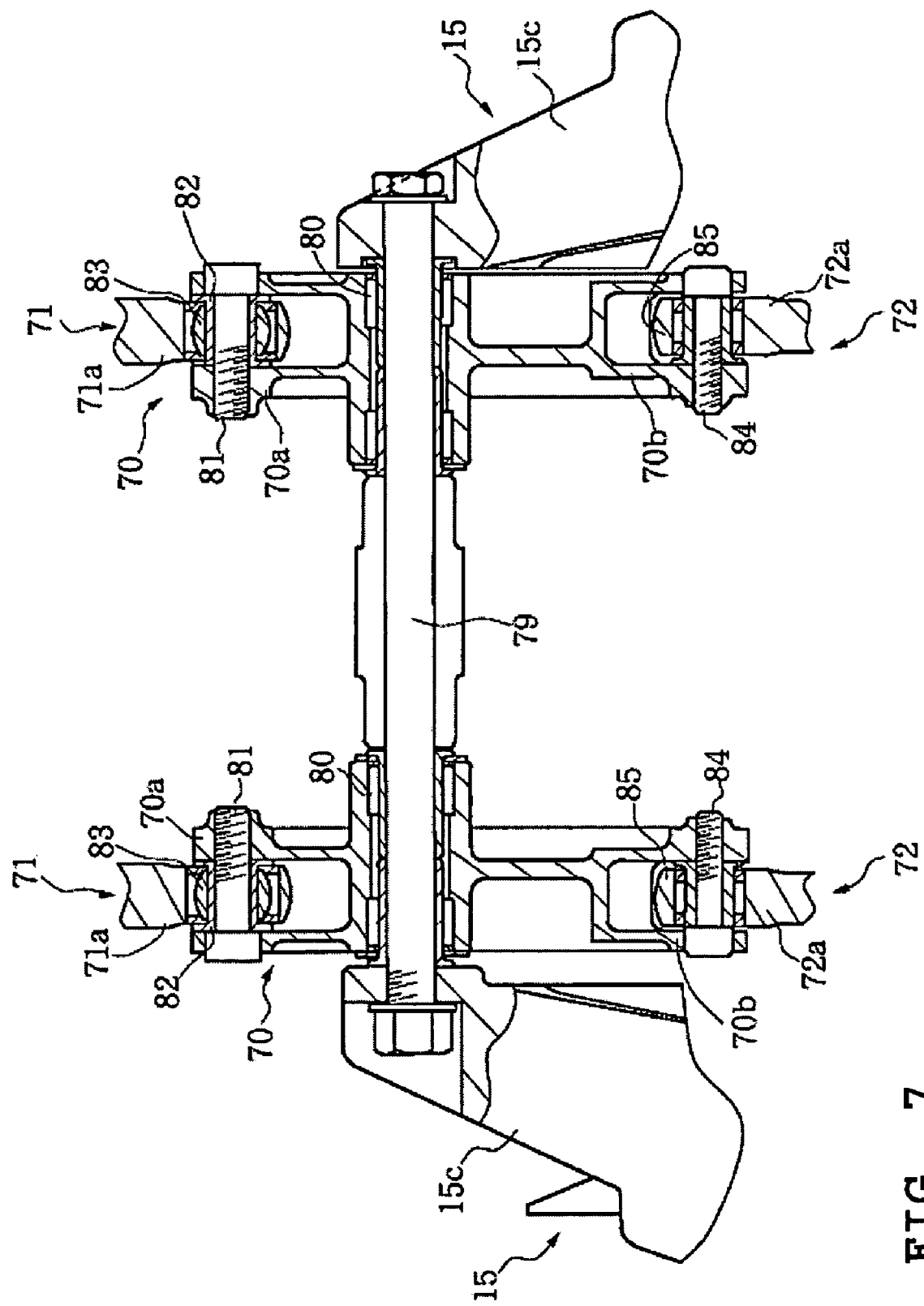
FIG. 7 is a sectional view taken along a line VII—VII of FIG. 4.
Figure 8:
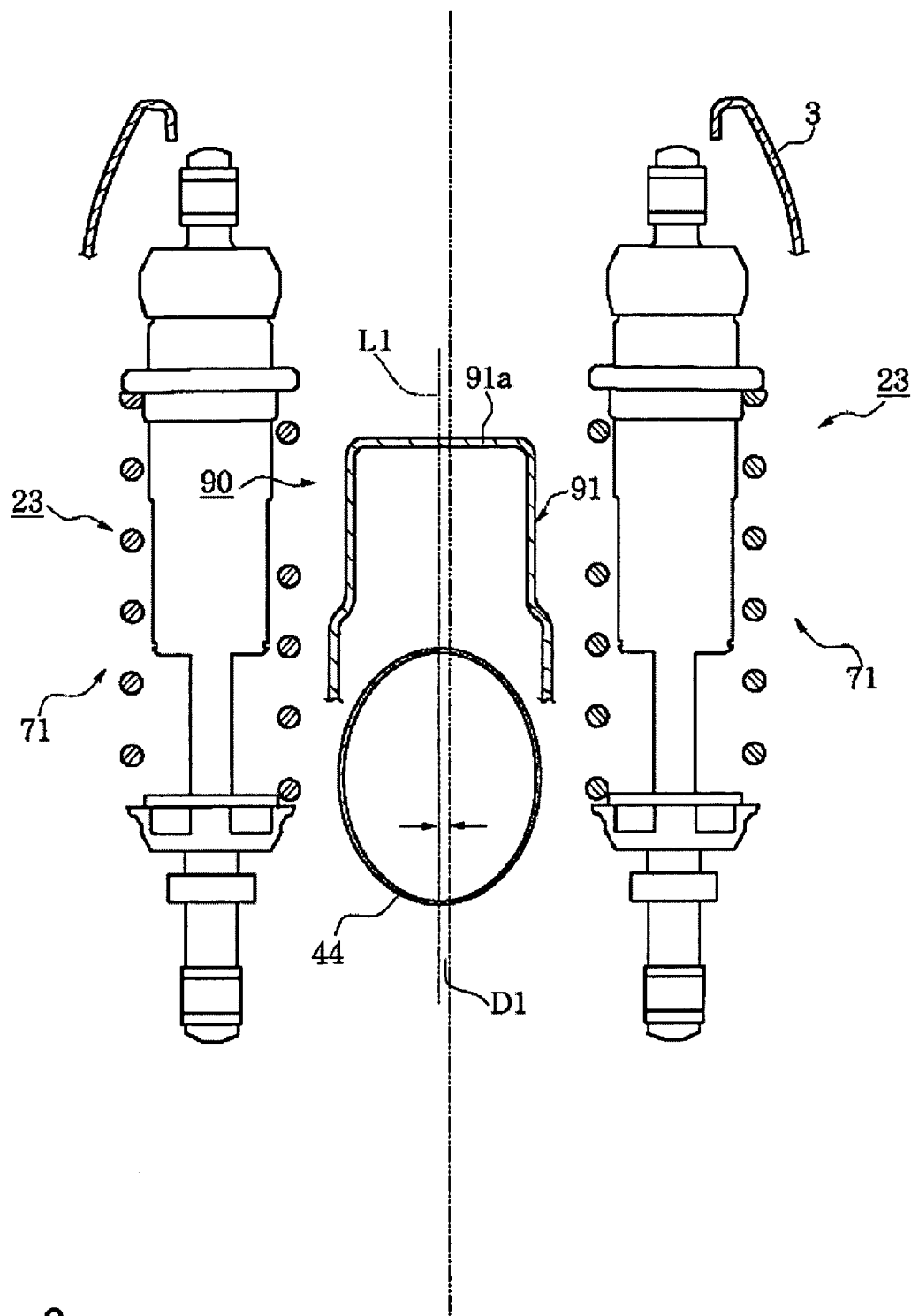
FIG. 8 is a sectional view taken along a line VIII—VIII of FIG. 2.
Figure 9:
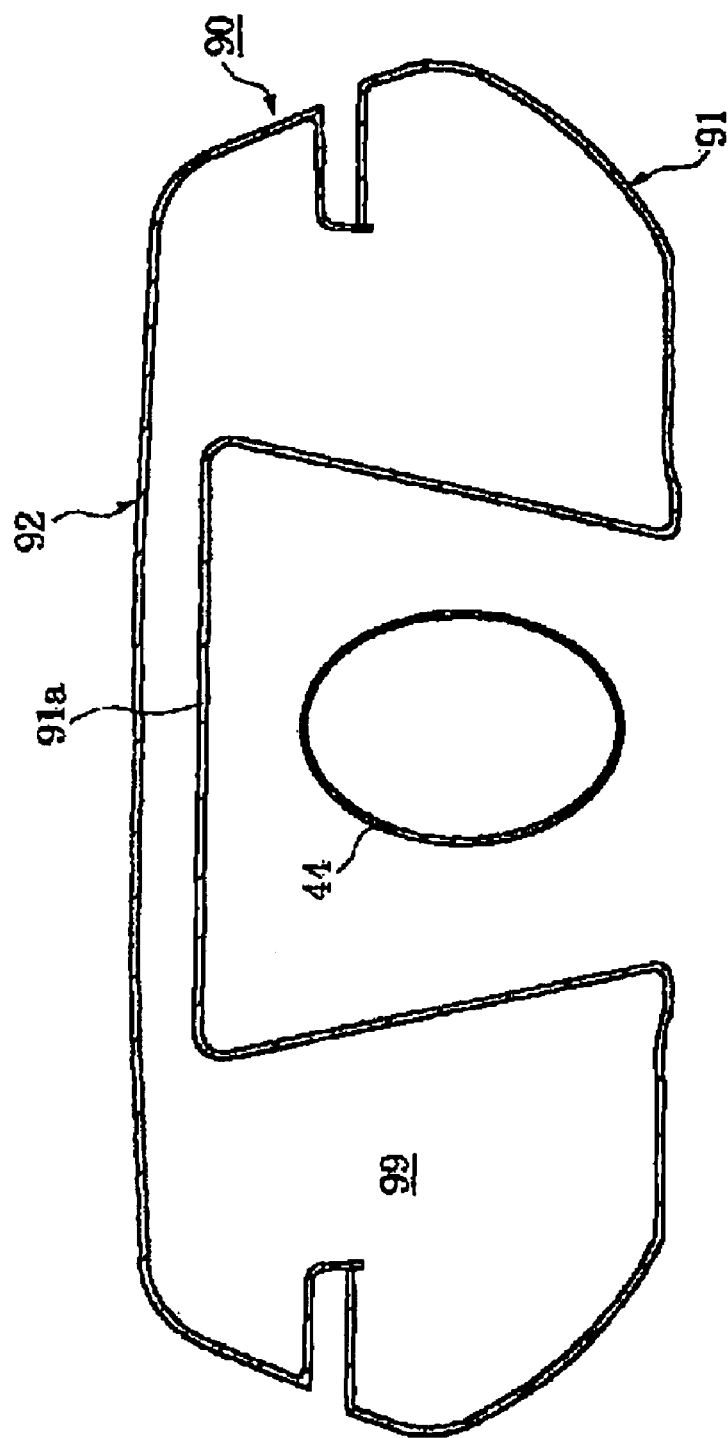
FIG. 9 is a sectional view taken along a line IX—IX of FIG. 2.
Figure 10:
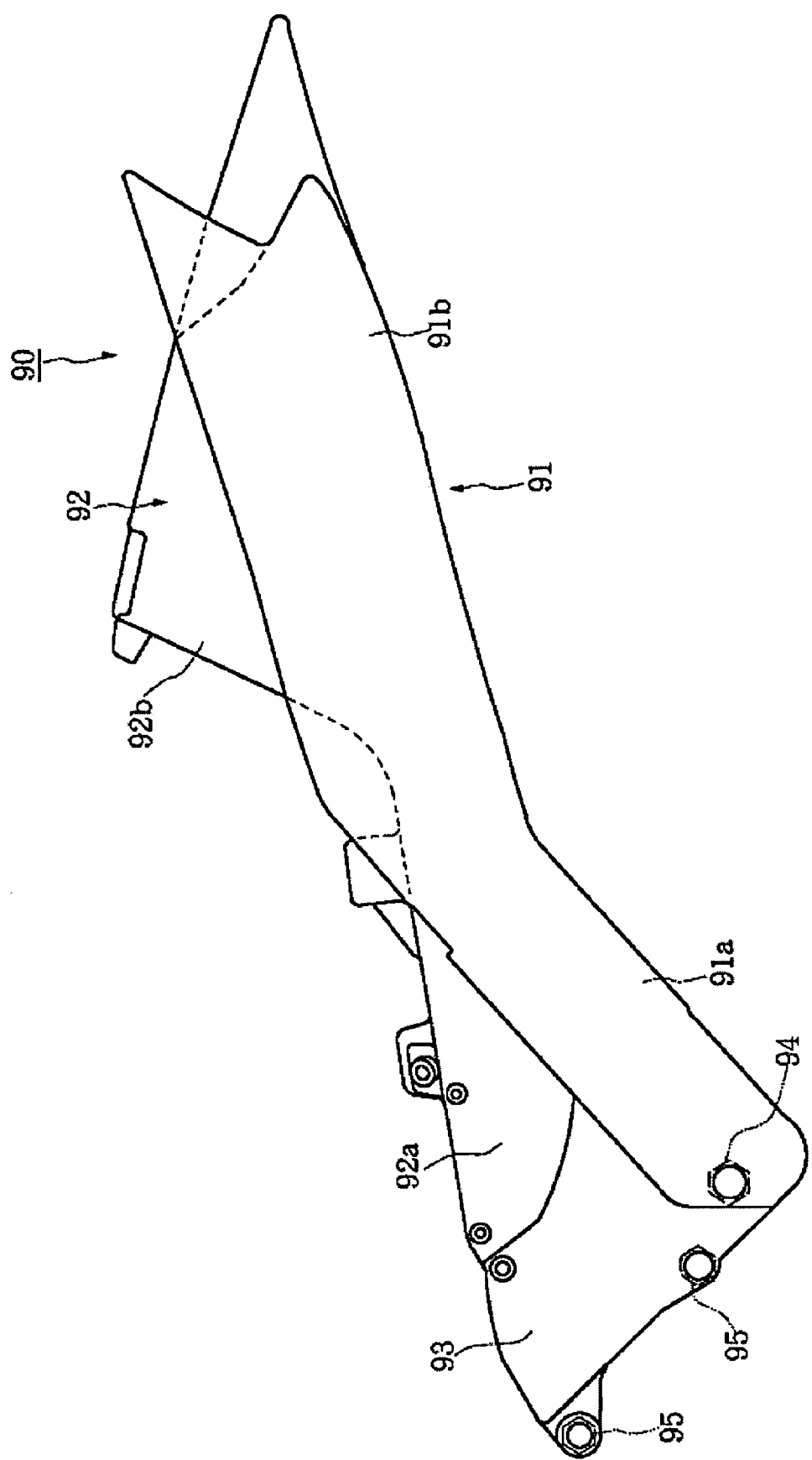
FIG. 10 is a side view of a seat back stay unit.
Figure 11:
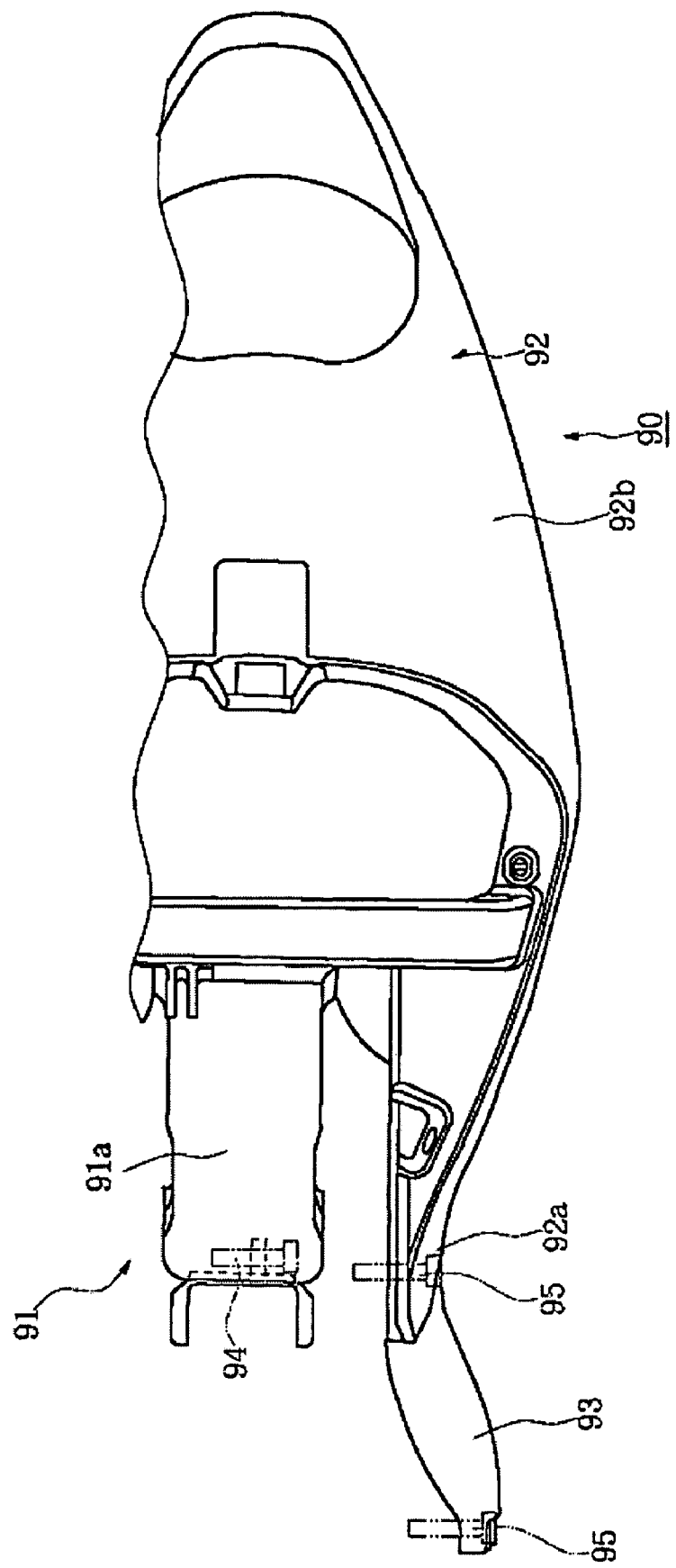
FIG. 11 is a plan view of the seat back stay unit.
Figure 12:
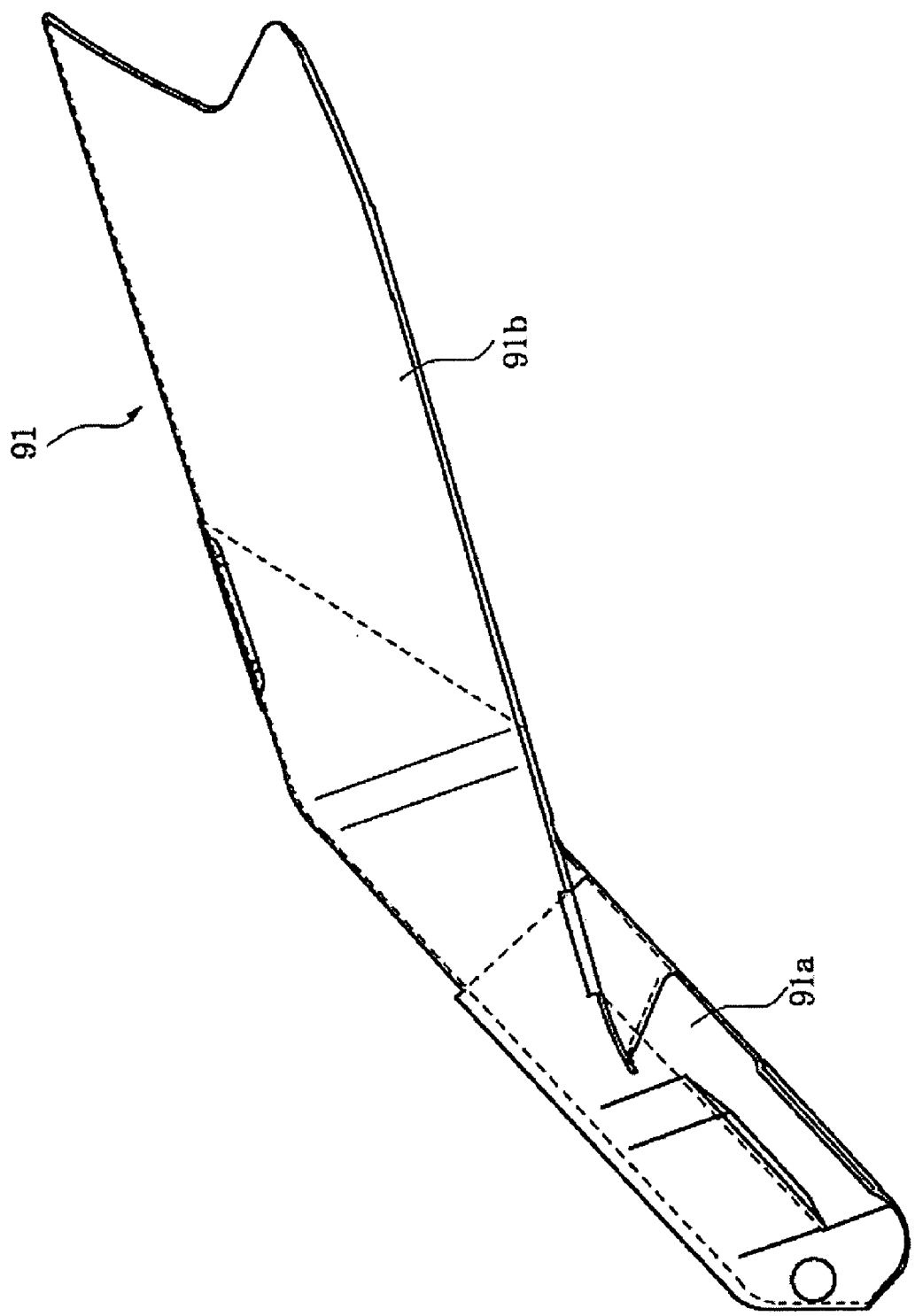
FIG. 12 is a side view of a lower back stay.
Figure 13:
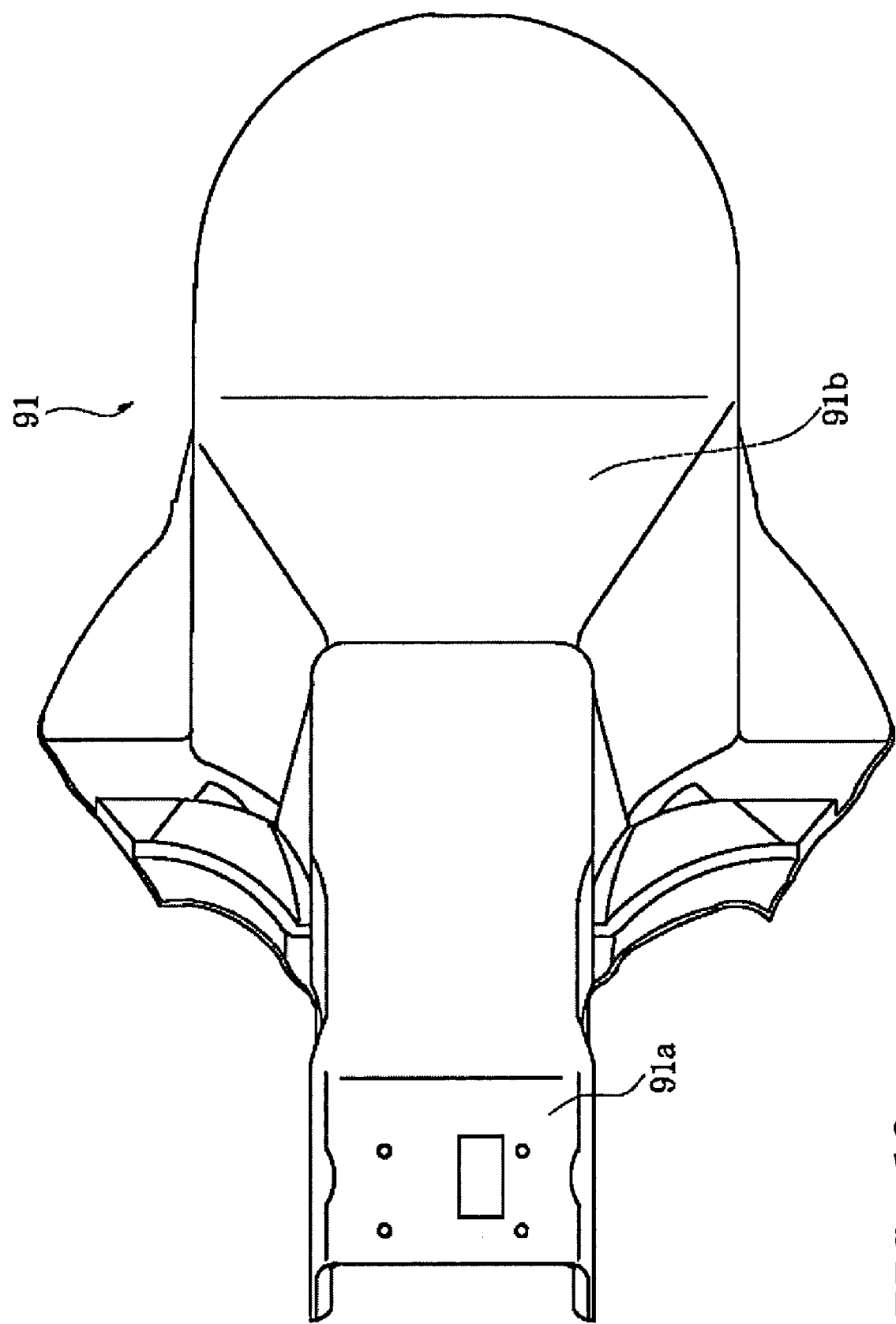
FIG. 13 is a front view of the lower back stay.

FIG. 1 is a side view of a motorcycle. FIG. 2 is a side view showing an arrangement of a rear arm, a rear cushion and an exhaust pipe. FIG. 3 is a plan view showing an arrangement of a main frame, a rear arm and rear cushions. FIG. 4 is a side view showing an arrangement of the rear arm and the rear cushion. FIG. 5 is a sectional view taken along a line V—V of FIG. 4. FIG. 6 is a sectional view taken along a line VI—VI of FIG. 4. FIG. 7 is a sectional view taken along a line VII—VII of FIG. 4. FIG. 8 is a sectional view taken along a line VIII—VIII of FIG. 2. FIG. 9 is a sectional view taken along a line IX—IX of FIG. 2. FIG. 10 is a side view of a seat back stay unit. FIG. 11 is a plan view of the seat back stay unit. FIG. 12 is a side view of a lower back stay. FIG. 13 is a front view of the lower back stay.

The motorcycle 1 of this embodiment includes a body frame 2, a body cover 3 covering the body frame 2, an engine 4 suspended from the body frame 2, a front wheel 5, a rear wheel 6, a fuel tank 7, a seat 8 and the like. A body includes the body frame 2 and the engine 4 suspended from the body frame 2.

The body frame 2 mainly includes a head pipe 1, a main frame 15, in the shape of an inverse letter L in profile, extending in a downward direction towards the rear from the head pipe 11, and a seat back stay 90 or a seat supporting member extending in the rearward direction from the rear upper part of the main frame 15 for placing a seat 8. The head pipe 11 is provided with a front fork 12 supported for steering movement, a handle 13 connected to the front fork 12 at the top and the front wheel 5 suspended at the lower end of the front fork 12.

The engine 4 is mounted to the main frame 15, and a radiator 14 is disposed at the front of the main frame 15 and in front of the engine 4. The engine 4 is a four-cylinder, four-stroke engine, and an intake duct 40 and an intake box 41 are disposed in an upward direction of a cylinder 4a of the engine 4, by which intake air is introduced to a carburetor 42 disposed behind the cylinder 4a.

The fuel tank 7 is disposed on the main frame 15. The fuel tank 7 extends in a downward direction at the rear bottom and a fuel pump 43 is disposed inside the extension 7a. Upon operation of the fuel pump 43, fuel is supplied to the carburetor 42 through a supply hose 43a and excessive fuel is returned from a return hose 43b to the fuel tank 7.

Four exhaust pipes 44 are connected to the cylinder 4a of the engine 4 at the front side. The four exhaust pipes 44 are assembled into two pipes below the engine 4, which pipes extend around a region below the engine 4. These two exhaust pipes 44 are assembled into one pipe behind the engine 4. A muffler 45 is connected to the assembled exhaust pipe 44. The muffler 45 is disposed at a higher position than a rear wheel axle, and thus, it is fixed to the seat back stay 90 at a higher position than the rear wheel 6. In this embodiment, the four exhaust pipes and the muffler are respectively denoted by reference numerals 44 and 45, but the exhaust pipes 44 include the muffler 45, which means the pipes or the paths allow exhaust gas to be directed into the atmosphere from the cylinder 4a of the engine 4.

The main frame 15, as shown in FIGS. 1 and 2, is a wide rectangular body with a hollow section, consisting of left and right horizontal sections 15a extending in a rearward direction from the head pipe 11, and vertical sections 15b extending in a downward direction from the rear portions of the horizontal sections 15a, and supporting a load applied to the seat 8.

A rear arm 21 is attached to the vertical sections 15b of the main frame 15 for an up and down swinging movement about a pivot shaft 22, as shown in FIGS. 1–4, which is supported by rear cushions 23 on the body. The rear wheel 6 is supported on the rear arm 21 at the rear end.

A chain 26 is stretched over a sprocket 24 provided on an output shaft 4b of the engine 4 and a sprocket 25 provided on an axle 6a of the rear wheel 6. Power of the engine 4 is transmitted to the rear wheel 6 by the chain 26. The chain 26, as shown in FIG. 3, is disposed on the left side with respect to a longitudinal body center line L1.

The rear arm 21, as shown in FIGS. 1–4, consists of a central connecting section 21a, a pair of forward side-sections 21b extending in a forward direction from the connecting section 21a in a forked relation, and a pair of rear side-sections 21c extending in a rearward direction from the connecting section 21a in a forked relation. A cross member 27 is welded between the pair of forward side-sections 21b, as shown in FIG. 3.

The rear arm 21 is formed with a downwardly projecting reinforcement convex section 21d extending between the forward side-section 21b and the rear side-section 21c. The reinforcement convex section 21d has a triangular shape in profile projecting to a lowermost position at the central connecting section 21a. A chain through opening 21e is opened in the projecting section for the passage of the chain 26. In this way, the rear arm 21, having the downwardly projecting reinforcement convex section 21d, can be provided with the reinforcement convex section 21d without taking into account interference with the pair of left and right rear cushions 23. Therefore a rear arm 21 with sufficient rigidity can be adopted.

The pair of forward side-sections 21b of the rear arm 21, as shown in FIG. 5, are each set against the inside surfaces of the vertical sections 15b of the main frame 15. The pivot shaft 22 is inserted therein from the vertical section 15b on the right side through a boss 60. A bolt 63 is fastened to the pivot shaft from the vertical section 15b on the left side through a boss 61 and a lock 62. The pair of forward side-sections 21b of the rear arm 21 are supported on the pivot shaft 22 through bushes 64a, 64b and bearings 65a, 65b, respectively, and the cross member 27 is supported on the pivot shaft 22 through a collar 66.

The rear arm 21 is supported on the body through the pair of left and right rear cushions 23. The pair of left and right rear cushions 23, as shown in FIGS. 1–4 each includes a link 70 supported on the body, a cushion 71 having opposite ends 71a, 71b supported between one end 70a of the link 70 and the rear arm 21, and a rod 72 having opposite ends 72a, 72b supported between the other end 70b of the link 70 and the rear arm 21. Cushion performance is improved by the construction of the pair of left and right rear cushions 23.

One end 71b of the cushion 71, as shown in FIGS. 4 and 6, is supported through a bush 74 and a bearing 75 on a bolt 73 screwed in the upper part 21f of the rear arm 21. One end 72b of the rod 72 is supported through a bush 77 and a bearing 78 on a bolt 76 screwed in the upper part 21f of the rear arm 21.

The link 70, as shown in FIGS. 4 and 7, is supported through a bearing 80 on a support shaft 79 mounted to the boss sections 15c of the main frame 15. One end 71a of the cushion 71 is supported through a bush 82 and a bearing 83 on a bolt 81 screwed in one end 70a of the link 70. One end 72a of the rod 72 is supported through a bearing 85 on a bolt 84 screwed in the other end 70b of the link 70.

The lower end of the rear cushion 23 and that of the rod 72, as shown in FIGS. 4 and 6, are supported on the upper part 21f of the rear arm 21, and the rear cushion 23 and the rod 72 can be disposed compact without interference with other members. A rear fender 86 is attached to the upper part 21f of the rear arm 21 at a position further rearward than the cushion 71.

The cushion 71 is disposed to the rear of the rod 72 and the cushion 71 can be removed from the rear of the body, facilitating adjustment of the cushion.

The links 70 disposed on the left and right sides, as shown in FIG. 7, are supported on a common support shaft 79 supported on the body, enabling reduction in the number of parts as a result of use of common parts, and compact arrangement without interference with other members.

The rear arm 21 of this embodiment, as shown in FIGS. 1–3, is supported on the body through the pair of left and right cushions 23 and the exhaust pipe 44 is disposed extending in an upward direction from below the engine 4 and passing through a space behind the pivot shaft 22 and between the pair of forward side-sections 21b of the rear arm 21, and as shown in FIG. 8, through a space between the pair of left and right rear cushions 23.

As described above, the exhaust pipe 44 is disposed passing through a space between the pair of left and right rear cushions 23. Therefore the exhaust pipe does not interfere with the rear arm 21 and the rear cushions 23, so that a rear arm 21 of a large rigidity can be adopted. The rigidity can be set at any given value, the degree of freedom of designing a motorcycle can be increased and a large bank angle can be secured easily.

In addition, the exhaust pipe 44, as shown in FIGS. 3 and 8, is disposed on the longitudinal body center line L1. Therefore the rear arm 21 need not be formed in the shape of a relief so as not to interfere with the exhaust pipe. Thus, a rear arm 21 of a larger rigidity can be adopted, the rigidy can be set at any given value, and the degree of freedom of designing a motorcycle can be increased.

Further, the pair of left and right rear cushions 23 and the exhaust pipe 44, as shown in FIGS. 3 and 8, are offset from the longitudinal body center line L1 by a distance D1 in the direction opposite to the chain 26 for transmitting power of the engine 4 to the rear wheel. One rear cushion arranged on the same side as the chain 26 of the pair of left and right rear cushions 23 is disposed closer to the center line compared with the other rear cushion. As a result of being offset by a distance D1 in the direction opposite to the chain 26, the pair of left and right rear cushions 23 and the exhaust pipe 44 can be disposed compact without interference with the chain 26.

Further, the rear cushions 23 and the exhaust pipe 44, as shown in FIGS. 1, 2 and 8, are disposed in a crossing relation, and if they are disposed such that their overlapping area in profile becomes smaller, heat transmission from the exhaust pipe 44 to the rear cushions 23 is mitigated. In this way, the thermal influence of the exhaust pipe 44 on the rear cushions 23 can be decreased depending on the arrangement of the rear cushions 23 and the exhaust pipe 44.

In this embodiment, the rear end 44a of the exhaust pipe 44, and the muffler 45 connected to the rear end 44 are attached to the seat back stay 90 or the seat supporting member, and the seat 8 is disposed on the seat back stay 90.

The seat back stay 90 includes a lower seat back stay 91 or a lower seat supporting member and an upper seat back stay 92 or an upper seat supporting member joined together in one body. The lower seat back stay 91 and the upper seat back stay 92 are formed from a heat insulating material such as carbon resin.

The seat back stay 90 is thus made up of the upper seat back stay 92 with the seat in place, and the lower seat back stay 91 is connected to and separated in a downward direction from the upper seat back stay 92.

The lower seat back stay 91, as shown in FIGS. 10–13, is configured as a plate-like member in a shape to cover a region above at least the exhaust pipe 44 and, in this embodiment, it has a forward portion 91a covering a region above the rear end 44a of the exhaust pipe 44, and a rear portion 91b covering a region below the muffler 45. The upper seat back stay 92, as shown in FIGS. 10 and 11, has body-side fitting portions 92a extending in a forward direction on both left and right sides and a rear portion 92b covering a region above the muffler 45. Fixed frame sections 93 are fixed to the body-side fitting portions 92a of the upper seat back stay 92.

In such a manner as described above, the seat back stay 90 is made up of the upper seat back stay 92 with the seat 8 in place, and the lower seat back stay 91 connected to and separated in a downward direction from the upper seat back stay 92. The lower seat back stay 91 is configured as a plate-like member in a shape to cover a region above at least the exhaust pipe 44. This allows heat from the exhaust pipe 44 to be blocked by the lower seat back stay 91 and a space between the lower seat back stay 91 and the upper seat back stay 92, so that heat transmission from the exhaust pipe 44 to the seat 8 is prevented. Therefore, no heat insulating material or the like is required to be used to prevent heat transmission from the exhaust pipe to the seat 8.

Further, as shown in FIG. 9, the upper seat back stay 92 is configured as a plate-like member, and the seat back stay 90 is made up of the upper seat back stay 92 and the lower seat back stay 91 in a hollow shape. Therefore, the hollow section 99 serves as an insulating space, and heat transmission from the exhaust pipe 44 to the seat can be more reliably prevented.

Regarding the seat back stay 90, as shown in FIGS. 1, 2 and 8, the front of the seat back stay 90 passes through a space between the pair of left and right rear cushions 23 and the exhaust pipe 44. The forward portion 91a of the lower seat back stay 91 is fastened to the boss 15c of the main frame 15 with a bolt 94 and its frame sections 93 are fastened to the boss 15c with bolts 95, whereby the seat back stay 90 is attached to the main frame 15.

As described above, the front of the seat back stay 90, passing through a space between the pair of left and right rear cushions 23 and the rear end 44a of the exhaust pipe 44, is attached to the main frame 15. Therefore the seat back stay 90 can be supported on the main frame 15 reliably and heat transmission from the exhaust pipe 44 to the rear cushions 23 can be prevented by the seat back stay 90.

The seat back stay 90 covers the rear end 44a of the exhaust pipe 44 at the forward portion 91a of the lower seat back stay 91 and a region surrounding the muffler 45 at its rear portion 91b and the rear portion 92b of the upper seat back stay 92. The seat back stay 90 covers the exhaust pipe 44 and it has a shape to cover the muffler 45 as well as the exhaust pipe 44, so that heat transmission from the exhaust pipe 44 and the muffler 45 can be shut off, the seat 8 can be supported with a simple structure, the heat transmission is mitigated, the number of parts is reduced and the cost lowered.

Although in this embodiment, the forward portion 91a of the lower seat back stay 91 covers the rear end 44a of the exhaust pipe 44 and its rear portion 91b and the rear portion 92b of the upper seat back stay 92 cover a region surrounding the muffler 45, the muffler 45 may be disposed at the forward portion 91a of the lower seat back stay 91 so that the region surrounding the muffler 45 is covered by the forward portion 92a of the upper seat back stay 92.

The seat back stay has a structure in which a frame portion 93 for supporting the seat 8 opens in a downward direction, therefore it shuts off heat transmission from the exhaust pipe 44 as well as supporting the seat 8, and the exhaust pipe 44 can be cooled down by the outside air.

Further, the seat back stay 90 extends to a position where it is interposed between the rear cushions 23 and the exhaust pipe 44, to cover the exhaust pipe 44, thereby preventing heat transmission from the exhaust pipe 44 to the rear cushions 23 reliably.

Further, a catalyst 97 is disposed in the rear end 44a of the exhaust pipe 44, as shown in FIGS. 1 and 2 so that exhaust gas is purified to be discharged to the atmosphere, but the seat back stay 90 covers a portion of the exhaust pipe 44 where the catalyst 97 is disposed inside. As a result of the seat back stay 90 covering a portion of the exhaust pipe 44 where a catalyst 97 is disposed inside, heat transmission from the catalyst 97 at high temperatures can be shut off.

As described above, an embodiment of the present invention includes a seat supporting member made up of an upper seat supporting member with the seat in place, and a lower seat supporting member connected to and separated in a downward direction from the upper seat supporting member. The lower seat supporting member is configured as a plate-like member in a shape to cover a region above at least an exhaust pipe. This allows heat from the exhaust pipe to be blocked by the lower seat supporting member and a space between the lower seat supporting member and the upper seat supporting member, so that heat transmission from the exhaust pipe to the seat is prevented. Therefore, no heat insulating material or the like is required to be used to prevent heat transmission from the exhaust pipe to the seat.

The lower seat supporting member has a structure in which a frame portion for supporting the seat opens in a downward direction, therefore it shuts off heat transmission from the exhaust pipe as well as supporting the seat, and the exhaust pipe can be cooled down by the outside air.

According to an embodiment of the present invention, the front of the lower seat supporting member, passing through a space between a pair of left and right rear cushions and the exhaust pipe, is attached to a body. Therefore, the lower seat supporting member can be supported on the body reliably, and heat transmission from the exhaust pipe to the rear cushions can be prevented by the lower seat supporting member.

The lower seat supporting member extends to a position where it is interposed between the rear cushions and the exhaust pipe, to cover the exhaust pipe, thereby preventing heat transmission from the exhaust pipe to the rear cushions reliably.

Also, the lower seat supporting member has a shape to cover the muffler in addition to the exhaust pipe. Therefore heat transmission from the exhaust pipe and the muffler can be shut off.

In addition, the lower seat supporting member covers a portion of the exhaust pipe where a catalyst is disposed inside. Therefore, heat transmission from the portion of the catalyst at high temperatures can be shut off.

The seat supporting member is made up of the upper seat supporting member and the lower seat supporting member in a hollow shape. Therefore the hollow section serves as an insulating space, and heat transmission from the exhaust pipe to the seat can be more reliably prevented.

What is claimed is:

1. A motorcycle comprising:
 a seat supporting member provided extending in a rearward direction from a body,
 the seat supporting member comprising:
 an upper seat supporting member with a seat in place; and
 a lower seat supporting member connected to and separated in a downward direction from the upper seat supporting member, the lower seat supporting member is configured as a plate member in a shape to cover a region above at least an exhaust pipe; and
 a rear arm supported on the body through a pair of left and right rear cushions for an up and down swinging movement,
 wherein a front portion of the lower seat supporting member passes through a space between the pair of left and right rear cushions and the exhaust pipe and is attached to the body.

2. The motorcycle according to claim 1, wherein the lower seat supporting member has a structure in which a frame portion for supporting the seat opens in a downward direction.

3. The motorcycle according to claim 1, wherein the lower seat supporting member has a shape to cover a muffler in addition to the exhaust pipe.

4. The motorcycle according to claim 3, wherein the muffler is positioned above a rear wheel.

5. The motorcycle according to claim 1, wherein the lower seat supporting member covers a portion of the exhaust pipe where a catalyst is disposed inside.

6. The motorcycle according to claim 1, wherein the upper seat supporting member is configured as a plate member and wherein the seat supporting member is made up of the upper seat supporting member and the lower seat supporting member formed in a hollow shape and defining a heat insulating space therebetween.

7. The motorcycle according to claim 1, wherein the seat supporting member is connected to a body frame.

8. The motorcycle according to claim 1, further comprising an engine mounted on the body frame.

9. The motorcycle according to claim 8, wherein the exhaust pipe is connected to the engine and disposed below the seat.

10. The motorcycle according to claim 1, wherein the upper seat supporting member and the lower seat supporting member are made of a heat insulating material.

11. The motorcycle according to claim 10, wherein the heat insulating material is a carbon resin.

12. A motorcycle comprising:
 a seat supporting member provided extending in a rearward direction from a body, the seat supporting member comprising:
 an upper seat supporting member with a seat in place; and
 a lower seat supporting member connected to and separated in a downward direction from the upper seat supporting member, the lower seat supporting member is configured as a plate member in a shape to cover a region above at least an exhaust pipe,
 wherein the lower seat supporting member extends to a position where the lower seat supporting member is interposed between rear cushions and the exhaust pipe, to cover the exhaust pipe.

13. A motorcycle comprising:
 a seat supporting member extending in a rearward direction from a body,
 the seat supporting member comprising:
 an upper seat supporting member with a seat in place; and
 a lower seat supporting member connected to and separated in a downward direction from the upper seat supporting member, the lower seat supporting member is configured as a plate member in a shape to cover a region above at least an exhaust pipe; and
 means for covering a region surrounding a muffler,
 wherein a rear arm is supported on the body through a pair of left and right rear cushions for an up and down swinging movement, and a front portion of the lower seat supporting member, which passes through a space between the pair of left and right rear cushions and the exhaust pipe is attached to the body.

14. A motorcycle comprising:

a seat supporting member extending in a rearward direction from a body, the seat supporting member comprising:

an upper seat supporting member with a seat in place; and a lower seat supporting member connected to and separated in a downward direction from the upper seat supporting member, the lower seat supporting member is configured as a plate member in a shape to cover a region above at least an exhaust pipe; and means for covering a region surrounding a muffler, wherein the lower seat supporting member extends to a position where the lower seat supporting member is interposed between rear cushions and the exhaust pipe, to cover the exhaust pipe.

* * * * *